April 7, 1953
C. SPERLING
2,633,763
ANGLE DRILLING AND TAPPING DEVICE
Filed July 28, 1950
2 SHEETS—SHEET 1
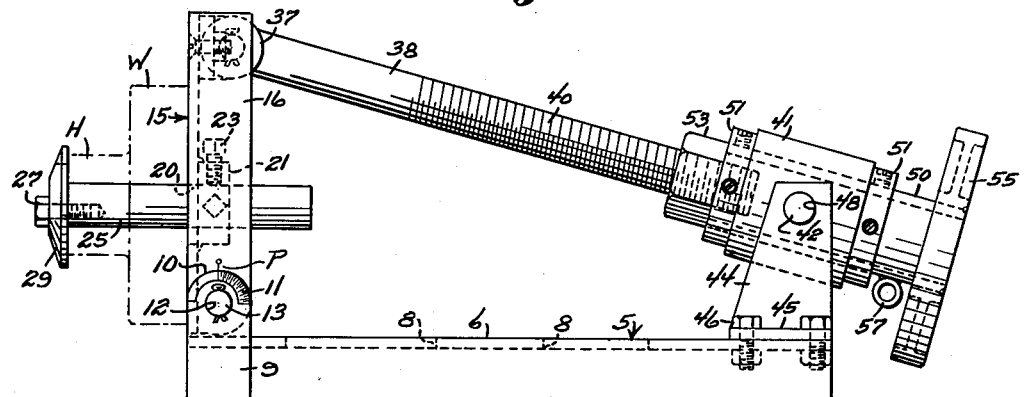
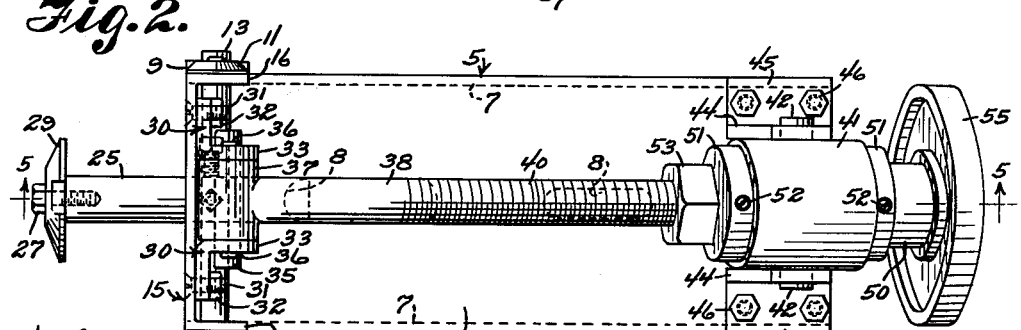
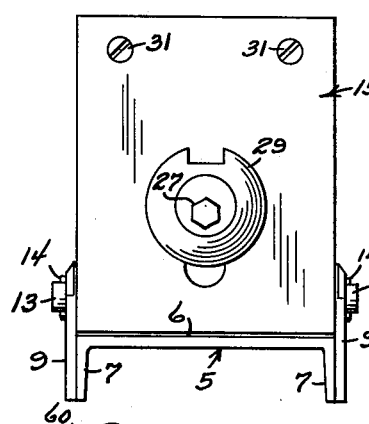
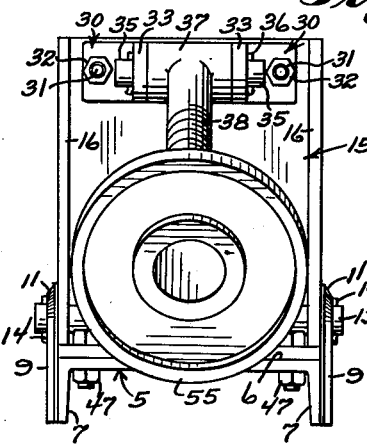
INVENTOR.
Charles Sperling
BY Victor J. Evans & Co.
ATTORNEYS April 7, 1953 C. SPERLING 2,633,763
ANGLE DRILLING AND TAPPING DEVICE
Filed July 28, 1950 2 SHEETS—SHEET 2
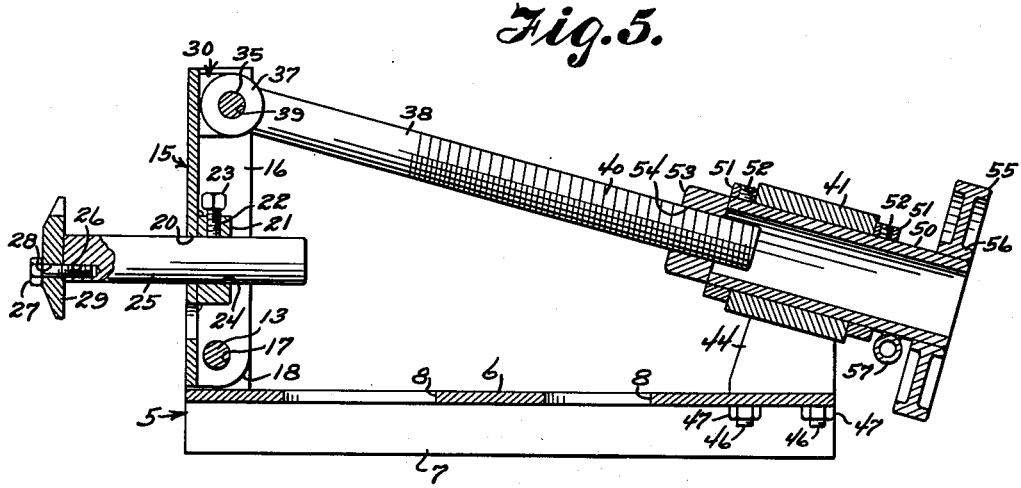
Fig. 5.
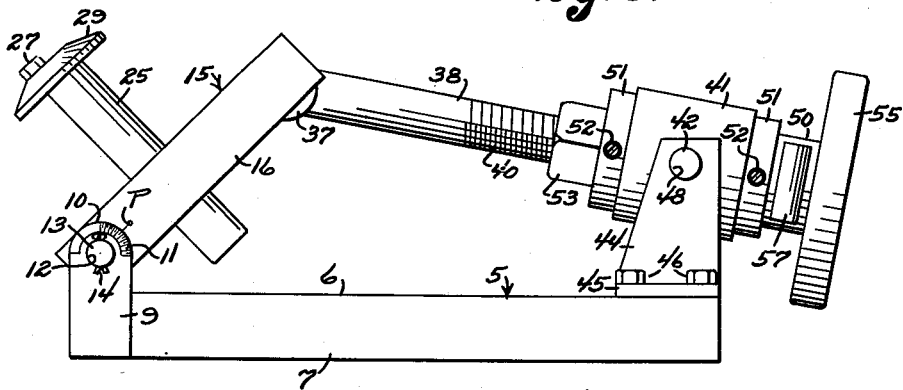
Fig. 6.
Fig. 7. Fig. 8. Fig. 9.
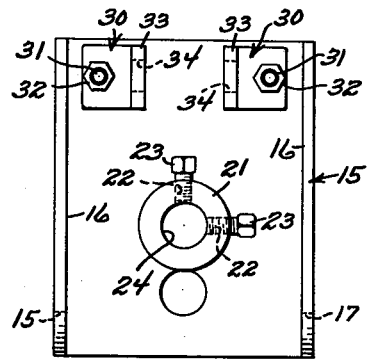
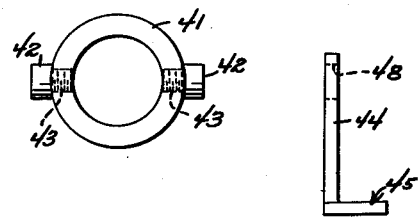
INVENTOR.
Charles Sperling
BY Victor J. Evans & Co.
ATTORNEYS Patented Apr. 7, 1953

2,633,763

UNITED STATES PATENT OFFICE 2,633,763

ANGLE DRILLING AND TAPPING DEVICE

Charles Sperling, Camden, N. J.

Application July 28, 1950, Serial No. 176,461

5 Claims. (Cl. 77—63)

The present invention relates to improvements in angle drilling and tapping devices, and more particularly to a jig or fixture for holding round work pieces to facilitate drilling and tapping openings therein at different angles.

One object is to provide a jig or fixture for holding work pieces such as gears, pulleys and similar devices for properly positioning the same with respect to a drill or other cutting tool while forming oblique openings in various parts of the work pieces such as the hubs thereof for the reception of set screws.

Another object is to provide a jig or fixture for holding round work pieces which can be adjusted to various angular positions with respect to the drill spindle axis to permit the drilling and tapping of oblique openings in planes normal to as well as longitudinally of the work piece axis.

Another object is to provide a jig or fixture for holding work pieces which can be quickly and easily adjusted by means of a screw threaded manually operated actuator used in conjunction with a graduated protractor scale arranged to indicate various angular positions of the work holder between zero and 90 degrees angular limits.

Other objects and advantages of the invention will become apparent during the course of the following description of the accompanying drawings wherein:

Figure 1 is a side elevational view illustrating the work holding fixture in a position normal to the perpendicular axis of a drill or other machine tool.

Figure 2 is a top elevational view showing the manner in which the threaded actuator rod is connected to the adjustable support and the manner in which the actuating sleeve is trunnioned on the base.

Figure 3 is a front elevational view of the jig or fixture showing the adjustable supporting plate and the manner in which the work holder is arranged thereon.

Figure 4 is a rear elevational view showing the manually operable control member for moving the supporting plate to various angular positions.

Figure 5 is a longitudinal cross sectional view taken on line 5—5 of Figure 2 and looking in the direction of the arrows to illustrate various structural details.

Figure 6 is a side elevational view similar to Figure 1 but showing the supporting plate and work holder adjusted to an angular position of approximately 45 degrees.

Figure 7 is a rear elevational view of the supporting plate showing the collar thereon for receiving work holding shafts of various diameters.

Figure 8 is an end elevational view of the manually operable screw shaft actuator sleeve.

Figure 9 is an edge elevational view of one of the trunnion brackets for supporting the trunnion sleeve shown in Figure 8, and Figure 10 is a side elevational view, similar to that shown in Figure 6 showing an angle attached to the supporting plate for providing a V to hold objects that are round or of other shapes.

In the drawings, and more in detail, there is shown for the purpose of convenience of illustration a base generally designated 5 including a channel-shaped member having a flat plate 6 and side flanges 7. The plate-like portion 6 is provided with elongated openings 8 (Figure 5) to receive the hold down bolts (not shown) on the bed of a drill press or the like. The bed of the drill press (also not shown) usually is provided with a series of spaced apart undercut slots for receiving the heads of two or more hold down bolts which are used for holding work pieces, and the openings 8 are arranged in spaced apart relation a pre-determined distance to facilitate reception of the hold down bolts.

Affixed to the side flanges 7 at one end of the base 5 is a pair of vertical brackets 9 which may be held in place by being welded to said flanges 7, and the upper portions of the brackets are rounded as at 10 and are marked as at 11 to provide a zero to 90 degree protractor scale. Each of the brackets 9 is provided with an opening 12 in its upper end for receiving a bearing rod 13 which is held in place by cotter keys or the like as at 14, and rockably mounted on said bearing rod is a supporting plate 15 having side flanges 16 provided with alined openings 17 for receiving the bearing rod 13. Thus, the supporting plate can rock from a vertical position about the axis of the bearing rod 13 through an angular distance of approximately 90 degrees. The lower edges of the side flanges 16 are rounded as at 18 to permit the rocking movement of the supporting plate 15 in one direction from its vertical position. The lower edge of the supporting plate contactually engages the upper surface of the plate-like portion 6 of the base 5 when the supporting plate is in a vertical position to limit rocking movement of said supporting plate in the opposite direction.

Formed in the supporting plate 15 is an opening 20 which is surrounded by a collar 21 welded or otherwise secured to the rear face of the supporting plate, and said collar is provided with a pair of internally screw threaded bores 22 arranged in circumferentially spaced apart relation approximately 90 degrees for receiving correspondingly threaded set screws 23. The central opening 24 in the collar 21 is in alinement with the opening 20 for receiving a round work holder shaft 25. The work holder shaft 25 is of round section and of a suitable diameter to receive various round work pieces such as collars, gears, pulleys and the like. The opposite end of the work holding shaft 25 is provided with an internally threaded bore 26 for receiving a clamping screw 27 which passes through an eccentric opening 28 in a work clamping disk 29.

Secured to the rear face of the work holding support 15 is a pair of spaced apart brackets 30 which are held in place by bolts 31 and retaining nuts 32, and the angular portions 33 of said brackets are arranged in parallel spaced apart relation. Each of the angular portions 33 of the brackets 30 are provided with alined bearing openings 34 (Figure 7) for receiving a pivot pin 35 which is held in place by cotter keys or the like 36, and pivotally mounted on said pivot pin is the T head 37 of a screw threaded actuator shaft 38. The T head 37 is provided with a bore 39 of substantially the same diameter as the pin 35, and longitudinal movement on said pin is prevented by the angular portions 33 of the angle brackets 30.

In order to change the angular position of the supporting plate 15, the screw threaded shaft 38 is threaded throughout the greatest portion of its length as at 40, and is adapted to be controlled by manually operable mechanism located at the other end of the base 5. The manually operable mechanism includes a journal collar 41 having trunnion pins 42 threaded in diametral openings 43 (Figure 8). The journal collar 41 is mounted between trunnion brackets 44 which have their lower angular flanges 45 bolted to the base 5 as at 46. Retaining nuts 47 are threaded on the bolts 46 to securely anchor the trunnion brackets 44 in place. Each trunnion bracket 44 is provided adjacent its upper end with a bearing opening 48 for receiving the trunnion pins 42. Thus, the journal collar 41 may rock about the axis of the trunnion pins 42. Rotatably mounted within the journal 41 is a sleeve 50 which is held in place by locking collars 51 on each end thereof and arranged in abutting relation with the radial end walls of said journal collar 41. Set screws 52 are provided for locking the collars 51 in position. One end of the rotatable sleeve 50 has welded or otherwise affixed thereto a nut 53 having a threaded internal bore 54 corresponding to the diameter and pitch of the threads 40 on the shaft 38. Thus, as the actuator sleeve 50 is rotated the screw threaded rod 38 will feed into and out of said sleeve. In order to rotate the sleeve 50 a hand wheel 55 has its hub 56 secured to one free end of said actuator sleeve as indicated in Figure 5.

Welded or otherwise affixed to the actuator sleeve 50 is a tubular member 57 into which an elongated vise handle may be inserted to facilitate turning the sleeve 50.

In operation, the base 5 is bolted to the bed of a drill press and secured thereto by the hold down bolts. The work piece W is mounted on the shaft 25 and the hub H of the work piece W is clamped on the shaft 25 by means of the clamping disk 29. The shaft 25 is adjusted in a predetermined position depending upon the length of the axis of the work piece W by manipulating the set screws 23. Thus, the work piece W which may be a gear or other round object may be securely clamped on the shaft 25 between the outer face of the supporting plate 15 and the inner face of the clamping disk 29. After the work piece W has thus been placed in position, the hand wheel 55 is then manipulated such that a marking as for instance an indicator pointer P, printed or otherwise marked on the side flanges 16 of the supporting plate 15, is brought into registry with a predetermined scale marking on the protractor dial 11. After the pointer marking P has thus been positioned with respect to the protractor scale 11, it will be found that the work piece W is presented to the drill of the drill press at the desired predetermined angle for drilling an oblique opening in the hub H which later may be tapped to provide internal threads for receiving a set screw.

It is to be understood, that by simply displacing the base 5 an angular distance of 90 degrees about the drill spindle axis, oblique openings or bores can be formed in round work pieces in another plane. Primarily, the fixture is intended for use in supporting gears, pulleys and similar round work pieces having a hub which is to be drilled and tapped for receiving a set or locking screw.

When the fixture is used for round work or for work of other shapes the supporting plate 15 is provided with an angle 60 which is secured thereto by bolts 61 and the angle provides a V-shape work holding socket.

I claim:

1. In a work supporting fixture, a base adapted to be affixed to the bed of a drill press, a plate rockably mounted at one end on said base in side flanges adjacent one end thereof, work supporting and clamping means on the upper face of said plate adapted to hold a piece of work in position beneath the tool of said drill press and manually operable means connected to the end of the plate opposite to the said one end for adjusting said plate to various angular positions mounted on the upper face of said base adjacent the opposite end thereof.

2. In a work supporting fixture for a drill press, a base adapted to be affixed to the bed of said drill press, a work supporting base rockably at one end mounted on the upper face of said first base in side flanges adjacent one end thereof, work supporting and clamping means on said work supporting base adapted to present a piece of work beneath the tool of said drill press, a threaded actuator shaft connected to said work supporting base on the opposite face thereof adjacent the opposite end of said base to the end opposite to the said one end and a manually operable nut swiveled to said base for moving the work to various angular positions of adjustment.

3. In a work supporting fixture for a drill press, a base adapted to be affixed to the bed of said drill press, a plate rockably and adjustably secured to said base on the upper face thereof adjacent one end thereof, said base being provided with a protractor scale adapted to cooperate with a pointer on said plate to indicate various angular positions of adjustment, means for clamping a work piece on said plate and manually operable screw and nut adjusting means for moving said plate to various positions of angular adjustment mounted on the upper face of said base adjacent the opposite end thereof.

4. In a work supporting jig and fixture for a drill press, a base adapted to be bolted to the bed of a drill press, a plate rockably mounted at one end of said base on the upper face thereof, a shaft adjustably supported on said plate for receiving a round work piece, means on said shaft for removably clamping said work piece in position beneath the tool of said drill press, a protractor scale and pointer on said base and plate adapted to cooperate to indicate various angular positions of adjustment of said plate and manually operable screw and nut adjusting means mounted on the upper face of said base adjacent the opposite end for connecting said bed and plate to change the angular position of said work piece.

5. In a drill press jig and fixture, a base adapted to be bolted to the bed of a drill press, a plate rockably mounted at one end of said base on the upper face thereof, a protractor scale and pointer on said base and plate respectively adapted to cooperate one with the other to indicate various angular positions of said plate, a shaft adjustably secured to said plate and arranged with its axis normal thereto adapted to support a round work piece having a central opening for receiving said shaft, a clamping disk on the outer end of said shaft for clampingly engaging said work piece, an actuator shaft pivoted to said plate at one of its ends and having its opposite end threaded for a portion of its length, a manually operable control sleeve connected to the upper face of the base at the opposite end of said base and having an internally threaded bore for receiving said threaded shaft and a trunnioned journal mounted on said base for receiving and supporting said control sleeve.

CHARLES SPERLING.

REFERENCES CITED

The following references are of record in the file of this patent:

UNITED STATES PATENTS

| Number | Name | Date |
|---|---|---|
| 134,296 | Libbey | Dec. 24, 1872 |
| 1,060,574 | Anderson | May 6, 1913 |
| 1,409,343 | Karasick | Mar. 14, 1922 |
| 2,240,977 | Bryant et al. | May 6, 1941 |